(12) United States Patent
Berry et al.

(10) Patent No.: US 6,283,847 B1
(45) Date of Patent: Sep. 4, 2001

(54) POULTRY BREAST CARTILAGE HARVESTING SYSTEM

(76) Inventors: Allan Todd Berry, 5441 Britt Whitmire Rd., Gainesville, GA (US) 30506; Charles Thomas Pearson, 793 Soapstone Rd., Dahlonega, GA (US) 30533

( * ) Notice: Subject to any disclaimer, the term of this patent is extended or adjusted under 35 U.S.C. 154(b) by 0 days.

(21) Appl. No.: 09/501,691

(22) Filed: Feb. 10, 2000

(51) Int. Cl.[7] .................................................. A22C 17/02
(52) U.S. Cl. ........................................ 452/136; 452/165
(58) Field of Search ..................... 452/127, 136, 452/165, 135

(56) References Cited

U.S. PATENT DOCUMENTS

| | | | |
|---|---|---|---|
| 4,557,017 | * 12/1985 | Gasbarro | 452/136 |
| 4,593,432 | * 6/1986 | Hazenbroek | 452/136 |
| 5,269,722 | * 12/1993 | Diesing et al. | 452/127 |
| 5,368,520 | * 11/1994 | Koch et al. | 452/165 |
| 5,372,539 | * 12/1994 | Kunig et al. | 452/165 |
| 5,407,383 | * 4/1995 | Diesing et al. | 452/165 |
| 5,411,434 | * 5/1995 | McGoon et al. | 452/165 |
| 5,466,185 | * 11/1995 | Martin et al. | 452/165 |
| 5,545,083 | * 8/1996 | Bargele' et al. | 452/165 |
| 5,588,906 | * 12/1996 | Davis | 452/165 |

* cited by examiner

*Primary Examiner*—Willis Little
(74) *Attorney, Agent, or Firm*—B. J. Powell

(57) ABSTRACT

Apparatus for harvesting the cartilage connected to the breastbone on the skeletal portion of a poultry carcass including positioning means for positioning the breastbone for movement along a prescribed processing path and separating means for mechanically separating the cartilage from the breastbone as it moves along the processing path.

19 Claims, 5 Drawing Sheets

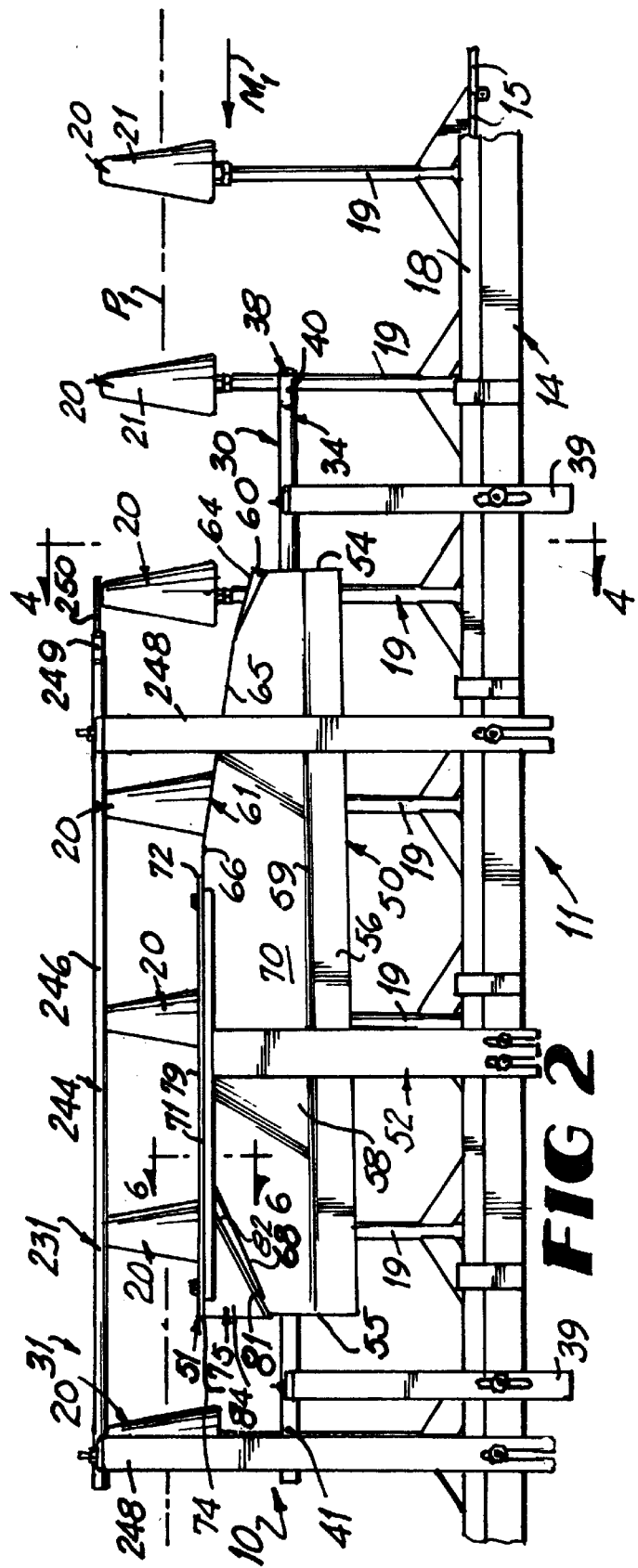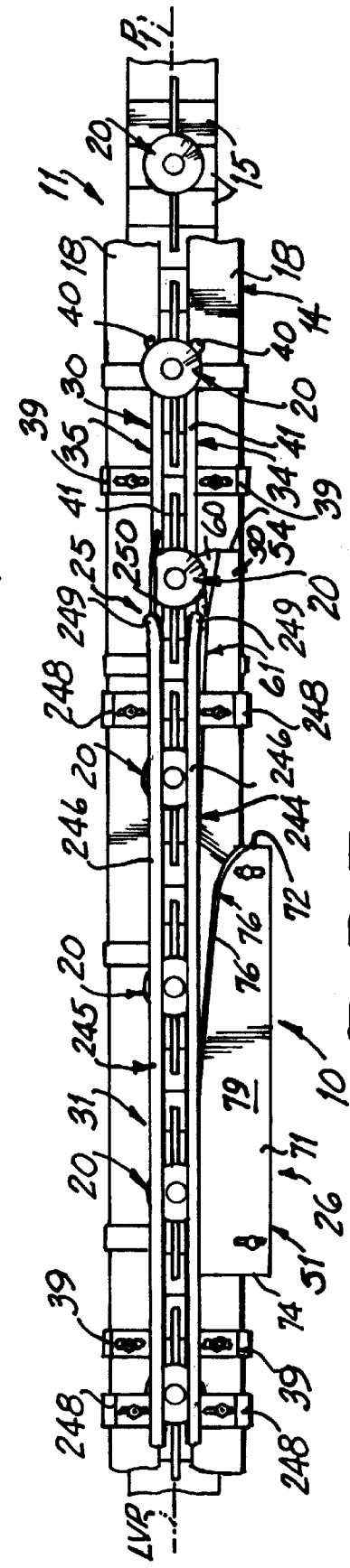

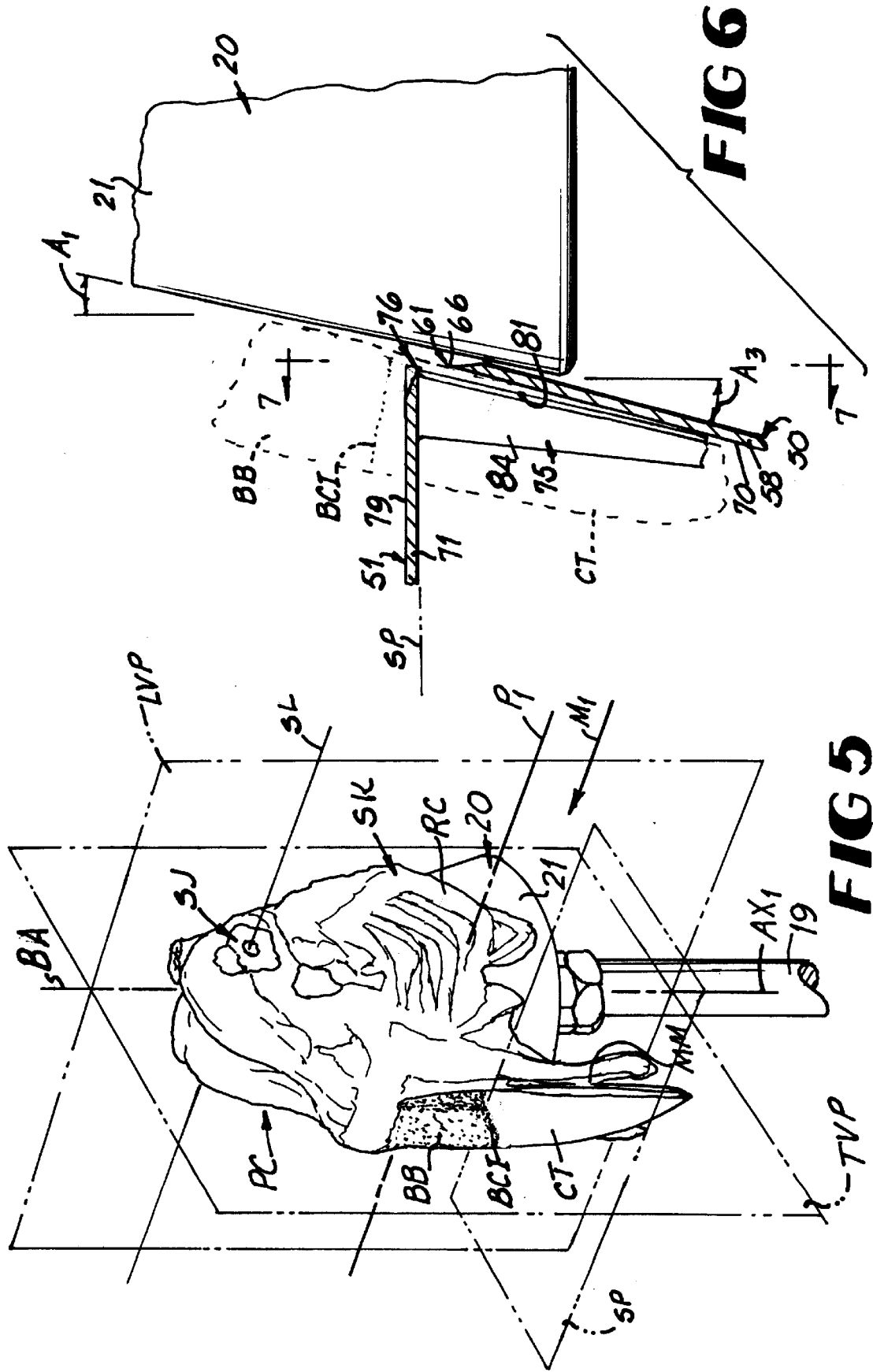

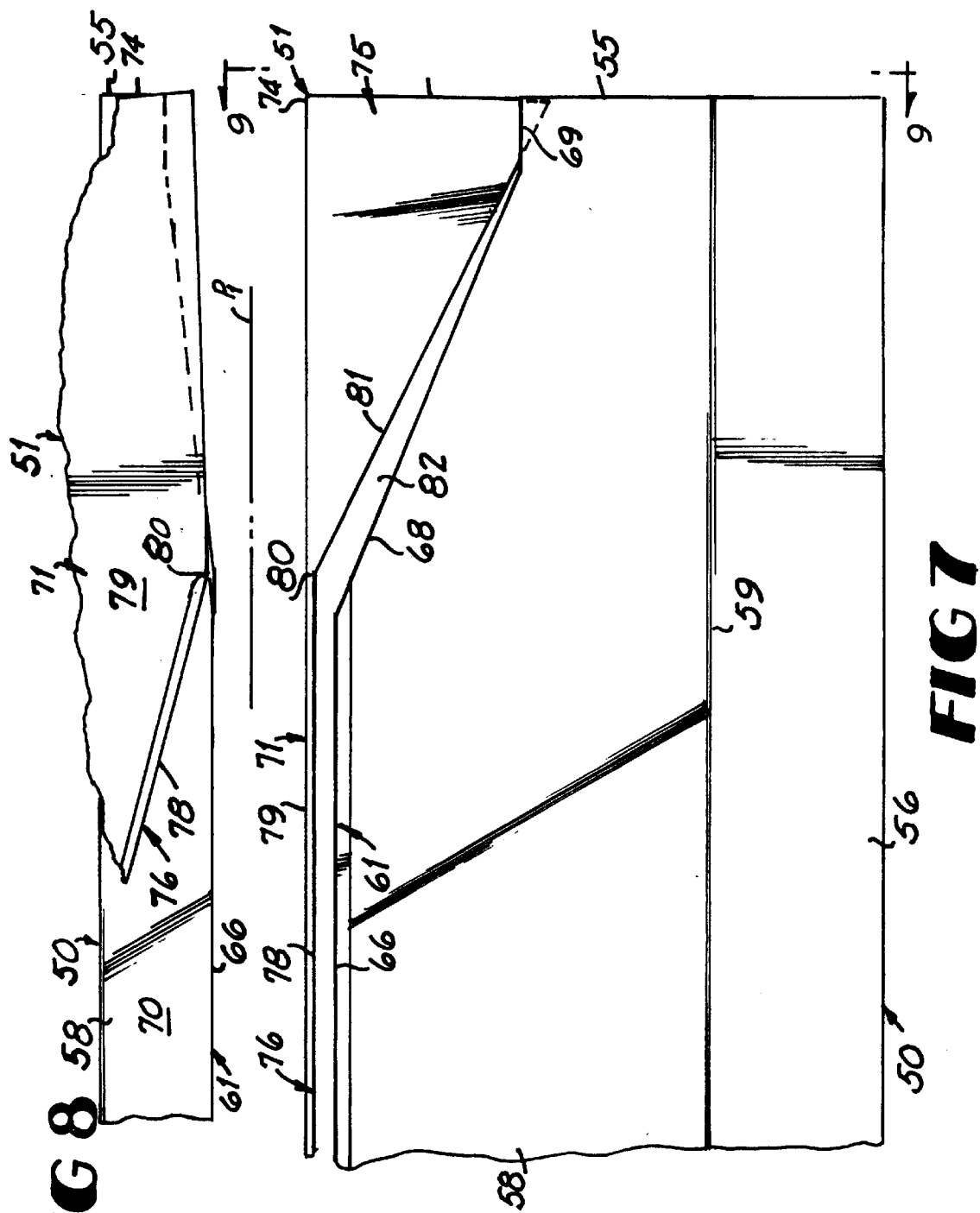

POULTRY BREAST CARTILAGE HARVESTING SYSTEM

BACKGROUND OF THE INVENTION

This invention relates generally to poultry processing and more particularly to the processing of a poultry carcass skeleton to recover the cartilage from the breast bone.

The cartilage from the breasts of poultry is used by the pharmaceutical and cosmetic industries as one of the ingredients for certain products. Heretofore, the cartilage has been manually recovered from the carcass skeleton after the meat has been removed in deboning operations. Not only is this manually operation tedious and highly repetitive, it is also sufficiently expensive to carry out that processors have been unable to recover their costs bases on the selling price of the cartilage harvested from the poultry carcass skeleton. Moreover, such manual operations have had difficulty in removing most of the meat and membranes still connected to the cartilage after the deboning operation so that significant further processing by the entities using the cartilage was required before the cartilage was ready for use as a pharmaceutical or cosmetic ingredient.

SUMMARY OF THE INVENTION

These and other problems and disadvantages associated with the prior art are overcome by the invention disclosed herein by providing a means for mechanically removing the cartilage from the breast bone of poultry at a minimum of manual intervention and cost so as to make the harvesting of cartilage from poultry breasts economical feasible for sale to the pharmaceutical and cosmetic industries. Moreover, the invention harvests the cartilage with a minimum of meat and membrane still attached to the cartilage thereby further reducing the processing by the pharmaceutical or cosmetic industry to prepare the cartilages for use in pharmaceuticals and cosmetics.

The apparatus of the invention includes positioning means for positioning the breastbone of the skeletal portion of a poultry carcass from which the meat has been removed in a deboning operation for movement along a prescribed processing path with a prescribed orientation; and separating means operatively associated with the prescribed processing path for engaging the cartilage connected to the breastbone as the poultry carcass moves along the prescribed processing path with the prescribed orientation and mechanically separating the cartilage from the breastbone as the poultry carcass is moved along the prescribed processing path. The separating means may further be constructed and arranged to separate any membranes and meat fragments connecting the cartilage to the skeletal portion of the poultry carcass from the cartilage. The separating means may further include a first edge portion thereon for cutting partly through the cartilage adjacent the juncture between the breastbone and the cartilage along a prescribed separation plane as the skeletal portion of the poultry carcass is moved along the prescribed processing path; and a second edge portion thereon for forcing the cartilage to completely separate from the breastbone along said separation plane coaxial with the cut formed by said first edge portion. The positioning means of the invention may further include shoulder guide means for engaging the separated shoulder joints of the skeletal portion of the poultry carcass and orienting the skeletal portion of the poultry carcass so that the common line joining the separated shoulder joints is generally parallel to the prescribed processing path along which the skeletal portion of the poultry carcass is moved. The apparatus of the invention may be operatively associated with a cone deboning conveyor mounting each poultry carcass on a support mandrel and sequentially moving the support mandrels along the prescribed processing path so that the positioning means orients each poultry carcass on the support mandrels in order that the skeletal portion of the poultry carcass is moved along the prescribed processing path with the breastbone in the prescribed orientation; and so that the separation means engages the cartilage connected to the breastbone as the skeletal portion of each poultry carcass supported on the support mandrel is moved along the prescribed processing path with the prescribed orientation to mechanically separate the cartilage from the breastbone as the poultry carcass is moved along the prescribed processing path. The positioning means may include cone guide means operatively associated with the cone deboning conveyor for maintaining the support mandrels in alignment with the prescribed processing path as the cone deboning conveyor moves the support mandrels, and carcass guide means operatively associated with the cone deboning conveyor for engaging the skeletal portion of each poultry carcass supported on the support mandrels to maintain the skeletal portion of the poultry carcass in the prescribed orientation as the skeletal portion of the poultry carcass is moved along the processing path on the support mandrel. separation means may include first means operatively associated with the cone deboning conveyor for cutting partly through the cartilage adjacent the juncture between the breastbone and the cartilage as the skeletal portion of the poultry carcass is moved along the prescribed processing path on the support mandrel in the prescribed orientation and second means operatively associated with the cone deboning conveyor for forcing the cartilage away from the breastbone to completely separate the cartilage from the breastbone along a separation plane coaxial with the cut formed by the first means. The separation means may further include membrane separation means operatively associated with the cone deboning conveyor for separating the membranes and meat fragments connecting the cartilage to the rest of the skeletal portion of the poultry carcass from the cartilage after the cartilage has been separated from the breastbone. The separation means may further include cartilage support means for supporting the cartilage in opposition to the first means for cutting partly through the cartilage. The invention may comprise the improvement in apparatus for use in deboning poultry carcasses comprising a plurality of base support members interconnected so as to form an endless conveyor, a plurality of upstanding mandrel supports mounted on the support members, a vertically oriented support mandrel adapted to fit inside a poultry carcass to support same mounted on the upper end of each of the mandrel supports so that the support mandrels are moved along a prescribed linear processing path, and guides for stabilizing the base support members in vertical and transverse directions, of cartilage harvesting means operatively associated with the support mandrels for separating the cartilage from the breastbone of the poultry carcass after the deboning operation and while the skeletal portion of the poultry carcasses are still supported on the support mandrels and moving along the prescribed linear processing path. The invention further includes the method of harvesting the cartilage from the breastbone of the skeletal portion of a poultry carcass after removal of the meat therefrom comprising the step of mechanically separating the cartilage from the breastbone along a separation plane located within the cartilage adjacent the juncture between the breastbone and the cartilage. The method of the invention may further comprise the step of mechanically orienting the skeletal portion of the poultry carcass while the cartilage is being mechanically separated from the breastbone. The method of the invention may further comprise the step of mechanically separating membranes and meat fragments connecting the cartilage to the skeletal portion of the poultry carcass from the cartilage. The step of mechanically separating the cartilage from the breastbone may further comprise cutting partly through the cartilage adjacent the juncture between the breastbone and the cartilage and then forcing the cartilage to completely separate from the breastbone along a separation plane generally coaxial with the cut formed in the cartilage. The method of the invention may further comprise the steps of mechanically moving the skeletal portion of the poultry carcass along a prescribed linear processing path while the cartilage is being separated from the breastbone; and mechanically engaging the separated shoulder joints between the wings and body on the poultry carcass to maintain the line joining the separated shoulder joints generally parallel to the prescribed linear processing path while the cartilage is being separated from the breastbone.

These and other features and advantages of the invention will become more clearly understood upon consideration of the following detailed description and accompanying drawings wherein like characters of reference designate corresponding parts throughout the several views and in which:

BRIEF DESCRIPTION OF THE DRAWINGS

FIG. 2 is side elevational view of the invention seen in FIG. 1;

FIG. 3 is a top view of the invention seen in FIG. 1;

FIG. 5 is a perspective view illustrating the skeletal portion of a poultry carcass mounted on the support mandrel of a cone deboning line;

FIG. 6 is an enlarged cross-sectional view taken along line 6—6 in FIG. 2;

FIG. 7 is a view showing the inside of the separating means taken generally along line 7—7 in FIG. 6;

FIG. 8 is a top view of the separating means as seen in FIG. 7; and

FIG. 9 is an end view of the separating means as seen along line 9—9 in FIG. 7.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
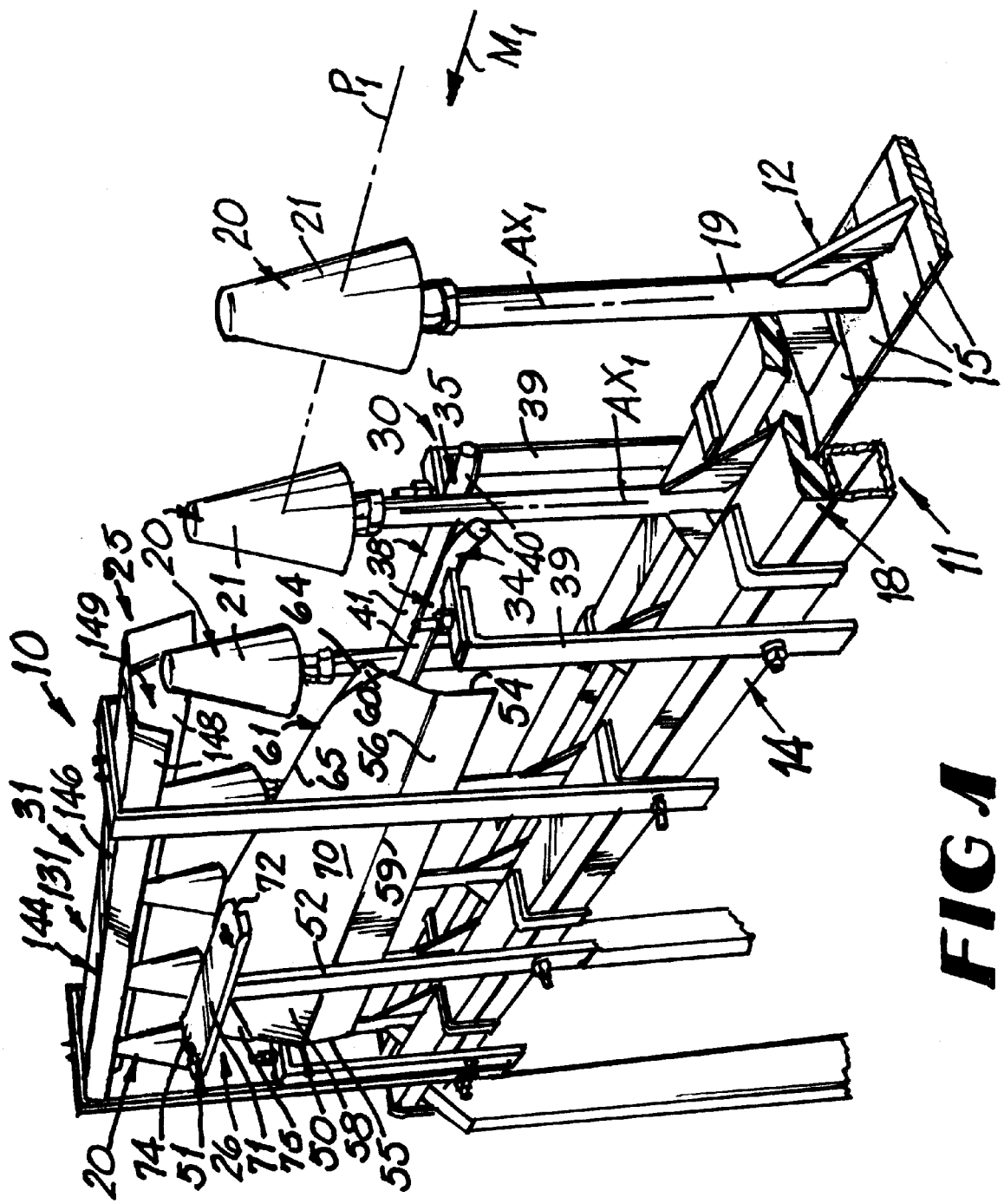
FIG. 1 is a perspective view illustrating the invention mounted on a cone deboning line.

Referring to FIGS. 1–4, it will be seen that the cartilage harvesting apparatus 10 incorporating the invention is designed to operate in conjunction with a poultry deboning line 11 of the type described in U. S. Pat. Nos. 4,385,419 and 5,535,876. The poultry deboning line 11 moves the poultry carcasses along a linear processing path $P_1$ where the meat is removed from the poultry carcass in known manner, usually manually. Normally, the skeletal portion of the poultry carcass remaining after the deboning operation is removed from the poultry deboning line without further processing. The cartilage harvesting apparatus 10 may be mounted on the poultry deboning line downstream of the deboning operation for harvesting the cartilage from the breastbone of the skeletal portion of the poultry carcass before it is removed from the deboning line 11 as illustrated in FIG. 1. However, it is to be understood that the cartilage harvesting apparatus 10 may be equipped with its own poultry carcass support subsystem without departing from the scope of the invention.

The poultry deboning line 11 comprises generally a poultry carcass conveyor 12 mounted on a support frame 14. The poultry carcass conveyor 12 includes a plurality of base support members 15 interconnected together to form an endless conveyor that is moved along a prescribed conveyor path by an appropriate drive assembly (not shown). The base support members 15 are positioned by a guide structure 18 so that the base support members 15 are confined both laterally and vertically by the guide structure 18 as they are moved along the conveyor path. Each of the base support members 15 mounts an upstanding mandrel support member 19 thereon on the upper end of which is mounted a carcass support mandrel 20. Thus, the guide structure 18 causes the support mandrels 20 to be successively moved along the prescribed processing path $P_1$. The cartilage harvesting apparatus 10 is designed to operate as the poultry carcass is moved along a linear portion of the processing path $P_1$ and in the direction indicated by the arrow $M_1$. It will likewise be understood that a separate poultry carcass conveyor system may be substituted for the poultry deboning line 11 without departing from the scope of the invention and the invention may also be used with other deboning systems without departing from the scope of the invention.

The particular support mandrels 20 illustrated are in the form of an upstanding cone with an outer conical support surface 21 that tapers inwardly from its lower to its upper end at an included angle $A_1$ of about 10–15° (see FIG. 6) with the vertical axis $AX_1$ of the support mandrel 20. The support mandrel 20 is sized so that the conical support surface 21 will fit into the body cavity of the processed poultry carcass through the access opening normally formed in the poultry carcass during the evisceration process of the poultry. Thus, the poultry carcass is internally supported on the mandrel 20 so that it is moved along the processing path $P_1$ by the conveyor 12 as is well known. Because it is necessary that the poultry carcass be oriented at different rotational positions relative to the vertical axis $AX_1$ to facilitate processing, the conical support surface 21 permits the carcass to be freely rotated about the mandrel 20. Where the support mandrel 20 configured so that the poultry carcass PC will not rotate about the mandrel itself, the mandrel 20 will be rotatably mounted on the mandrel support member 19 so that it will rotate with the poultry carcass about the vertical axis $AX_1$.

The cartilage harvesting apparatus 10 comprises generally a carcass positioning arrangement 25 for positioning and orienting the poultry carcass on the support mandrel 20; and a cartilage harvesting arrangement 26 for removing the cartilage from the breastbone on the skeletal portion of the poultry carcass while it is positioned by the positioning arrangement 25 and moved along the processing path $P_1$ on the support mandrel 20.

It will be appreciated that the deboning operation may be carried out on a whole bird poultry carcass or on the front half of the poultry carcass. The cartilage harvesting apparatus 10 will operate in substantially the same way to remove the cartilage from the skeletal portion of the poultry carcass remaining after the deboning operation regardless of whether the whole bird or the front half is being processed. For simplicity sake, the skeletal portion SK of the poultry carcass PC illustrated in the drawings is only the front half, it being understood that this description would likewise apply to a whole bird poultry carcass.

As seen in FIG. 5, the skeletal portion SK of the poultry carcass PC remaining after the deboning operation includes the breastbone BB, rib cage RC, and separated shoulder joint SJ where the wings (not shown) joined with the clavicle of the wishbone and the coracoid. The rear end of the breastbone BB is joined to the cartilage CT through an interface BCI. Usually membranes and meat fragments MM remaining after the deboning operation also still connect portions of the cartilage CT to the rest of the carcass. The cartilage CT is to be separated from the breastbone BB and it is desirable that the membranes and meat fragments MM be stripped therefrom as part of the harvesting operation to reduce the necessity of further processing. The poultry carcass PC has a longitudinal body axis BA that generally coincides with the vertical axis $AX_1$ when the poultry carcass is mounted on the support mandrel 20 and the shoulder joints SJ lie along a line SL generally normal to the body axis BA.

The poultry carcass PC is mounted on the support mandrel 20 with the separated shoulder joints SJ uppermost as seen in FIG. 5. The carcass positioning arrangement 25 engages the shoulder joints SJ to both orient the carcass PC rotationally about the support mandrel 20 and position the shoulder joints vertically along the support mandrel 20. Because the interface BCI between the cartilage and the breastbone is typically located a prescribed distance from the line SL of the shoulder joints SJ for a particular size bird and the breastbone is rotationally centered around the body axis BA between the shoulder joints SJ, locating the line SL at a particular location vertically along and rotationally about the vertical axis $AX_1$ serves to locate the interface BCI between the breastbone and cartilage at a particular vertical location relative to the support mandrel 20 and also rotationally about the support mandrel 20. The breastbone BB and cartilage CT have a generally T-shaped cross-sectional shape at the interface BCI with the base section located on the interior side of the breastbone and a projecting section extending exteriorly of the base section.

The carcass positioning arrangement 25 seen in FIGS. 1–4 includes a lower guide assembly 30 and an upper positioning assembly 31, both mounted on the support frame 14 of the deboning line 11. The lower guide assembly 30 serves to laterally confine the upstanding mandrel support members 19 as they are moved along the processing path $P_1$ to keep the vertical axes $AX_1$ of the support mandrels 20 located in a common longitudinally extending vertical plane LVP (see FIG. 5) while the upper positioning assembly 31 serves to engage the poultry carcasses PC carried on the support mandrels 20 to both rotationally orient the poultry carcass PC about the vertical axis $AX_1$ and vertically locate the carcass along the axis $AX_1$. As a result, the breastbone BB and cartilage CT are rotationally oriented about the vertical axis $AX_1$ of the support mandrel 20 carrying same as seen in FIG. 5 so that the projecting sections of the breastbone and cartilage are centered on a transverse vertical plane TVP lying along the vertical axis $AX_1$ and normal to the line SL passing through the shoulder joints by the lower guide assembly 30 and the upper positioning assembly 31.

The lower guide assembly 30 as seen in FIGS. 1–4 includes opposed front and rear guide subassemblies 34 and 35 located on opposite sides of the processing path $P_1$. The guide subassemblies 34 and 35 are mirror images of each other and each includes a guide rod 38 and a rod mounting arrangement 39 adjustably mounting the guide rod 38 on the support frame 14 of the poultry deboning line 11 so that the guide rod 38 is oriented generally parallel to the processing path $P_1$ and spaced therebelow so that the support mandrels 20 pass above the guide rod 38. Each guide rod 38 is spaced the same distance laterally of the processing path $P_1$ and the spacing between the guide rods 38 is just sufficient for the mandrel support members 19 to pass therebetween so that the mandrel support members 19 and the carcass support mandrels 20 are maintained centered on the processing path $P_1$. The rods 38 are sufficiently long to guide the mandrel support members 19 through the cartilage harvesting arrangement 10. Each rod 38 has an outwardly flaring inlet section 40 facing the oncoming mandrel support members 19 as they pass along the processing path $P_1$ that join with an elongate straight section 41 at the downstream end of the inlet section 40 to keep the mandrel support members 19 centered on the path $P_1$.

Two different embodiments of the upper positioning assembly 31 are illustrated. A first embodiment designated 131 is illustrated in FIG. 1 and a second embodiment 231 is illustrated in FIGS. 2–4, both of which are designed to engage the skeletal portion of the poultry carcass about the shoulder joints SJ to position and orient the poultry carcass.

The upper positioning assembly 131 seen in FIG. 1 includes a guide channel 144 and a channel mounting arrangement 145 adjustably mounting the guide channel 144 on the support frame 14 of the poultry deboning line 11. The guide channel 144 has a generally inverted U-shaped cross-section with a base section 146 and opposed depending side flanges 148 integral with the opposed side edges of the base section 146 to form a downwardly opening guide space 149 therein oriented parallel to the processing path $P_1$. The guide channel 144 is sized for the shoulder joints SJ of the poultry carcass PC to be slidably received in the guide space 149 with the side flanges 148 engaging the shoulder joints SJ of the poultry carcass to orient the line SL through the shoulder joints SJ parallel to the processing path $P_1$ and the transverse vertical plane LVP along which the breastbone BB is oriented normal to the processing path $P_1$. The base section 146 engages the shoulder joints SJ to force the poultry carcass PC down onto the carcass support mandrel 20 and vertically locate the poultry carcass on the support mandrel 20. This serves to positively locate the interface BCI between the breastbone and cartilage vertically relative to the processing path $P_1$. Thus, the poultry carcass PC is moved along the processing path $P_1$ with a prescribed orientation around the vertical axis $AX_1$ of the support mandrel 20 and with the interface BCI vertically located at a prescribed vertical location relative to the support mandrels 20. With the breastbone/cartilage interface BCI thusly located at a known position, the cartilage CT can be reliably removed from the breastbone BB with the harvesting arrangement 26.

Figure 4:
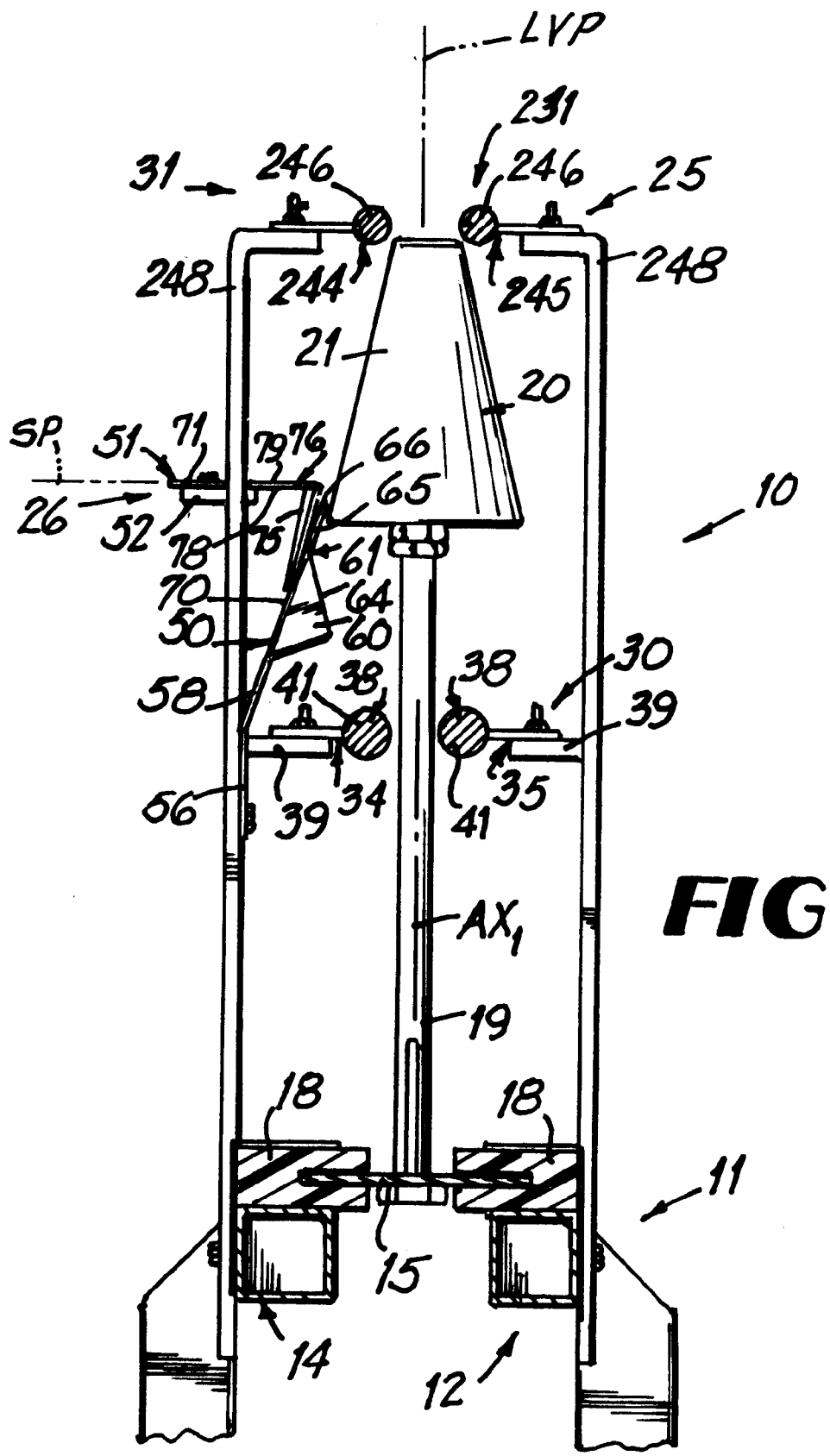
FIG. 4 is an enlarged cross-sectional view taken generally along line 4—4 in FIG. 2.

The upper positioning assembly 231 seen in FIGS. 2–4 includes opposed front and rear positioning subassemblies 244 and 245 located on opposite sides of the processing path $P_1$. The positioning subassemblies 244 and 245 are mirror images of each other and each includes a positioning rod 246 and a rod mounting arrangement 248 adjustably mounting the positioning rod 246 on the support frame 14 of the poultry deboning line 11 so that the positioning rod 246 is oriented generally parallel to the processing path $P_1$ and spaced thereabove. Each positioning rod 246 is spaced the same distance laterally of the processing path $P_1$ and the spacing between the positioning rods 38 is such that the rods 246 will engage opposite sides of the shoulder joints SJ of the poultry carcass to orient the line SL through the shoulder joints SJ parallel to the processing path $P_1$ and the transverse vertical plane LVP along which the breastbone BB is oriented normal to the processing path $P_1$. The positioning rod 246 on the rear guide subassembly 245 is constructed and arranged so that it will fit interiorly of the neck on the poultry carcass so that the neck does not interfere with the positioning of the carcass. The positioning rods 246 are vertically positioned relative to the support mandrels 20 so that they force the poultry carcass PC down onto the carcass support mandrel 20 to vertically locate the poultry carcass on the support mandrel 20. This serves to positively locate the interface BCI between the breastbone and cartilage vertically relative to the processing path $P_1$ as explained with respect to the guide assembly 131.

The positioning rods 246 are sufficiently long to keep the poultry carcass oriented as it passes through the cartilage harvesting arrangement 10. Each rod 246 has an outwardly flaring inlet section 249 facing the oncoming poultry carcasses as they pass along the processing path $P_1$ to feed the shoulder joints SJ on the poultry carcass in between the positioning rods 246. To insure that the neck passes outboard of the positioning rod 246 on the rear guide subassembly 245, an infeed rod extension 250 is provided on the inlet section 249 thereof. Thus, the guide subassemblies 244 and 245 cause poultry carcasses PC to be moved sequentially along the processing path $P_1$ with a prescribed orientation around the vertical axis $AX_1$ of the support mandrel 20 and with the interface BCI vertically located at a prescribed vertical location relative to the support mandrels 20. As a result, the breastbone/cartilage interface BCI is thusly located at a known position so that the cartilage CT can be reliably removed from the breastbone BB with the harvesting arrangement 26.

The cartilage harvesting arrangement 26 seen in FIGS. 1–4 includes a lower positioning blade 50 and an upper separating blade assembly 51, both of which are mounted on the support frame 14 of the deboning line 11 by a blade mounting arrangement 52. The lower positioning blade 50 serves to support the cartilage CT from the interior side thereof and also helps separate the membranes and meat MM connecting the cartilage CT to the rest of the skeletal portion of the poultry carcass. The upper separating blade assembly 51 serves to separate the cartilage CT from the breastbone BB along a separation plane SP through the cartilage CT adjacent the interface BCI between the breastbone and cartilage and also helps separate the membranes and meat connecting the cartilage CT to the rest of the skeletal portion of the poultry carcass. The separation plane SP is substantially normal to both the longitudinal vertical plane LVP along which the support mandrel central axes $AX_1$ are moved and the transverse vertical plane TVP on which the breastbone BB is centered.

The lower positioning blade 50 has an upstream end 54 as seen in FIG. 2 facing the oncoming support mandrels 20 as they are moved along the processing path $P_1$ in the direction of arrow $M_1$ and an opposed downstream end 55. The lower positioning blade 50 has a length shorter than the length of the guide rods 38 and is positioned so that the upstream end 54 thereof is located downstream of the upstream ends of the guide rods 38 while the downstream end 55 is located upstream of the downstream ends of the guide rods 38. This insures that the poultry carcass will be accurately positioned during the positioning of the cartilage CT by the blade 50.

The positioning blade 50 includes an upstanding elongate mounting section 56 extending along the length of the lower portion thereof and an inwardly inclined cartilage support section 58 integral with the upper edge of the mounting section 56 along juncture 59 and extending upwardly therefrom at an included angle $A_2$ of about 160–165° with respect to the mounting section 56 as seen in FIG. 9. The mounting section 56 is connected to the mounting arrangement 52 for locating the blade 50 relative to the processing path $P_1$ so that the juncture 59 is generally parallel to the processing path $P_1$.

The inwardly inclined cartilage support section 58 defines an infeed subsection 60 seen in FIGS. 1–4 in the uppermost corner thereof at the upstream end 54 of the blade 50 that is formed along bend line 59 so that the infeed subsection 60 angles inwardly of the plane of the cartilage support section 58 at about 15°. The uppermost edge 61 of the cartilage support section 58 has an infeed portion 64 extending along the infeed subsection 60, a stripping portion 65 seen in FIGS. 1 and 2 extending from the downstream end of the infeed portion 64 and angled upwardly from its upstream end toward its downstream end relative to the juncture 59 between the mounting and support sections 56 and 58, a locating portion 66 best seen in FIGS. 6–8 extending from the downstream end of the stripping portion 65 generally parallel to the juncture 59, a backup portion 68 best seen in FIGS. 2 and 7 extending from the downstream end of the locating portion 66 and angled downwardly from its upstream end toward its downstream end relative to the juncture 59, and a pinchoff portion 69 best seen in FIG. 7 extending from the downstream end of the backup portion 68 to the downstream end 55 of the blade 50 generally parallel to the juncture 59.

The portions 64, 65, and 66 of the edge 61 are sharpened to assist in cutting the membranes and meat connecting the cartilage CT with the rest of the skeletal portion of the poultry carcass. The bevel forming the sharpened portions 64, 65, and 66 of the edge 61 is formed on the inboard side thereof facing the support mandrels 20 passing along the processing path $P_1$. This serves to prevent the portions 64, 65, and 66 from cutting into the conical support surface 21 on the support mandrels 20 as will become more apparent during the cartilage harvesting operation and also pulls the interior side of the cartilage CT up against the outside support surface 70 of the blade 50.

The lower positioning blade 50 is positioned through the blade mounting arrangement 52 so that the juncture 59 is generally parallel to the processing path $P_1$ with the cartilage support section 58 angled inwardly toward the longitudinally extending vertical plane LVP at an included angle $A_3$ best seen in FIG. 6 and at a height such that the locating portion 66 of the edge 61 is located just below the interface BCI between the breastbone and cartilage seen in dashed lines in FIG. 6 as the poultry carcasses are moved along the processing path $P_1$ past the positioning blade 50 fixed relative thereto. The blade 50 is sized so that the lower edge of the outer carcass support surface 21 of the support mandrels 20 pass over the upstreammost end of the infeed portion 64 of the edge 61 to insure that the edge 61 passes behind the rearmost end of the cartilage CT while the stripping and locating portions 65 and 66 of the edge 61 pass outboard of the surface 21. Thus, the sharpened portions 65 and 66 of the edge 61 pass upwardly between the interior of the cartilage CT and the exterior of the support mandrel 20 so that membranes and meat MM connecting the edges of the cartilage CT to the rest of the skeletal portion of the poultry carcass PC will be cut closely adjacent the interior of the cartilage to release the cartilage CT therefrom. The angle $A_3$ is selected to be slightly greater than the angle $A_1$ so that the locating portion 66 can be located closely adjacent the outer surface 21 on the support mandrels 20 as they pass thereby. In this way, the outer surface 21 on the support mandrel 20 will contact the nonsharp juncture between the back surface and the bevel on the section 58 rather than the sharpened portions 65 and 66 of the edge 61 and thus prevent damage to the section 61 and/or the support mandrel 20. At the same time, the location of the bevel forming the sharpened portions 65 and 66 of the edge 61 insure that the portions 65 and 66 will pass closely adjacent the interior side of the cartilage to closely trim the membranes and meat fragments from the cartilage CT. The cartilage CT is supported from the interior side thereof on outside surface 70 of the support section 58 of the positioning blade 50 so that the breastbone/cartilage interface BCI is accurately positioned for the separating blade assembly 51.

The separating blade assembly 51 includes a cutting blade 71 with an upstream end 72 and a downstream end 74 seen in FIG. 3 and a separating blade 75 depending therefrom seen in FIG. 2. The inside edge 76 of the cutting blade 71 extends from the upstream end 72 to the downstream end 74. The edge 76 has an inwardly angled portion 78 extending from the upstream end 72 as seen in FIGS. 3 and 7–9 and the depending separating blade 75 is attached along the inside edge 76 of the cutting blade 71 immediately downstream of the angled portion 78 as seen in FIGS. 7 and 8 so that the blade 75 is flush with the edge 76. The angled portion 78 is sharpened with a single bevel on top of the blade 71 best seen in FIGS. 5, 7 and 8 to cut into the cartilage CT along the separation line SP as will become more apparent.

The cutting blade 71 is mounted on the support frame 14 of the deboning line 11 by the blade mounting arrangement 52 so that it is generally horizontally oriented. The separating blade 75 is oriented at a prescribed included angle $A_4$ of about 80–85° with the blade 71 as seen in FIG. 9. The cutting blade 71 is positioned so that the cutting blade 71 lies in a plane parallel to the path along which the breastbone/cartilage interface BCI is moved by the support mandrels 20 and defines the separating plane SP along which the cartilage CT will be separated from the breastbone. The blade 71 is also positioned so that the cartilage CT passes inboard of the upstream end of the sharpened angled portion 78 but with the portion 78 angling inwardly toward the processing path $P_1$ whereby the sharpened angled portion 78 gradually cuts into the cartilage CT along the separation plane SP as the poultry carcass PC moves thereby with the cartilage CT supported in opposition to the blade 71 by the positioning blade 50. The blade 71 is set so that the cartilage CT is substantially cut therethrough along the plane SP by the time the downstream end 80 seen in FIGS. 7 and 8 of the sharpened portion 78 is reached. After the cartilage CT has been cut, it engages the depending separating blade 75 which finishes separating the cartilage CT along the separating plane SP.

The separating blade 75 defines a downwardly angled edge 81 that is sharpened through a single bevel on the front side of the blade 75 that will be facing the cartilage CT separated from the breastbone. This causes the blade 75 to force the cartilage CT forwardly of the blade 75 as the blade 75 finishes separating the cartilage CT along the separation plane SP.

The separating blade 75 is located so that the edge 81 lies just downstream of the angled backup portion 68 of the uppermost edge 61 on the positioning blade 50 to form a downwardly angled opening 82 between the portion 68 and edge 81 as best seen in FIG. 7. The relative angles of the edge 81 and the backup portion 68 of edge 61 are such that the opening 82 tapers from its upper end to a point at its lower end. Even though the cartilage CT is separated from the breastbone BB when initially engaged by the blade 75, it is usually still connected to the skeletal portion of the carcass by some remaining membranes and meat fragments MM. Because the connecting membranes and meat try to pull the cartilage CT with the rest of the poultry carcass PC moving with the support mandrel 20, the cartilage CT is pulled up against and be supported on the outside surface 84 on the blade 75 and the outside surface 70 on the positioning blade 50 on opposite sides of the opening 82. This causes the sharpened edge 81 to cut any remaining connecting membranes and meat fragments MM still connected to the cartilage CT as the carcass continues to move with the support mandrel 20 and thus release the cartilage from the poultry carcass. The pinchoff portion 69 of the edge 61 on the positioning blade 50 passes across the edge 81 to insure that all of the membranes and meat fragments will be pulled off of the cartilage CT before the cartilage CT passes over the downstream end of the blades 75 and 50. The resulting separated cartilage CT is thus cleaned so that minimum processing is required before it can be used.

Operation

In operation, it will be seen that the poultry carcasses PC will be deboned in conventional manner while carried by the support mandrels 20. After the deboning operation, the mandrels 20 move the carcasses sequentially through the cartilage harvesting apparatus 10 along the processing path $P_1$. The mandrel supports 19 are engaged by the lower guide assembly 30 to accurately maintain the axes $AX_1$ of the support mandrels 20 moving along the longitudinal vertical plane LVP on the processing path $P_1$. The upper positioning assembly 31 engages the separated shoulder joint SJ of the skeletal portion of the poultry carcass PC to orient and position same on the support mandrel 20 as the mandrel 20 continues to move the poultry carcass along the processing path $P_1$.

The support mandrels 20 continue to move the skeletal portion SK of the poultry carcasses PC along the processing path $P_1$ past the positioning blade 50 and separating blade assembly 51 with the breastbone BB and cartilage CT properly oriented and positioned for harvesting the cartilage. The infeed subsection 60 on the positioning blade 50 passes interiorly of the cartilage CT so that the interior of the cartilage CT rides along the outside surface 70 of the inclined cartilage support section 58 of the blade 50. As the cartilage CT passes along the upwardly angled sharpened stripping portion 65 of the upper edge 61 on the blade 50, the membranes and meat fragments MM coming into contact with the stripping portion 65 of the edge 61 are cut away from the cartilage CT as the membranes and meat fragments MM are pulled taut over the portion 65 of the edge 61.

While the cartilage CT passes over the outside surface 70 of the positioning blade 50, the projecting portion of the cartilage comes into contact with the sharpened inwardly angled portion 78 on the inside edge 76 of cutting blade 71. The sharpened portion 78 cuts into the cartilage CT along the separation plane SP with an increasing depth as the cartilage CT moves therealong. By the time the cartilage CT reaches the downstream end 80 of the sharpened portion 78 of the inside edge 76, the cartilage CT has been substantially cut therethrough along the separation plane SP. The cartilage CT is then engaged by the downwardly angled sharpened edge 81 on the separating blade 75 that finishes separating the cartilage CT from the breastbone BB along the separation plane SP with the cartilage CT passing along the outside surface of the blade 75.

As the support mandrels 20 continue to move the skeletal portion SK of the poultry carcasses PC along the processing path P₁ past the separating blade 75, the downwardly angled sharpened edge 81 on the separating blade 75 passes down on the interior side of the cartilage CT. This causes the sharpened edge 81 on blade 75 to cut the membranes and meat fragments MM coming into contact therewith closely adjacent the edges of the cartilage CT as the membranes and meat fragments MM are pulled taut over the edge 81. This serves to release cartilage CT from the rest of the skeletal portion SK of the poultry carcass PC.

What is claimed as invention is:

1. Apparatus for removing the cartilage from the breastbone of the skeletal portion of a poultry carcass from which most of the meat has been removed in a deboning operation comprising:

a) positioning means for positioning the breastbone of the poultry carcass for movement along a prescribed processing path with a prescribed orientation; and b) separating means operatively associated with said prescribed processing path for engaging the cartilage connected to the breastbone as the poultry carcass moves along said prescribed processing path with said prescribed orientation and mechanically separating the cartilage from the breastbone as the poultry carcass is moved along said prescribed processing path.

2. The apparatus of claim 1 wherein said separating means is further constructed and arranged to separate membranes and meat fragments still connecting the cartilage to the skeletal portion of the poultry carcass from the cartilage.

3. The apparatus of claim 1 wherein said separating means defines a first edge portion thereon for cutting partly through the cartilage adjacent the juncture between the breastbone and the cartilage along a prescribed separation plane as the skeletal portion of the poultry carcass is moved along said prescribed processing path; and further defines a second edge portion thereon for forcing the cartilage to completely separate from the breastbone along said separation plane coaxial with the cut formed by said first edge portion.

4. The apparatus of claim 1 wherein said positioning means includes shoulder guide means for engaging the separated shoulder joints of the skeletal portion of the poultry carcass and orienting the skeletal portion of the poultry carcass so that the common line joining the separated shoulder joints is generally parallel to said prescribed processing path along which the skeletal portion of the poultry carcass is moved.

5. The apparatus of claim 1 wherein said positioning means includes carcass alignment means for locating the skeletal portion of the poultry carcass relative to said separating means so that said separating means separates the cartilage from the breastbone along a separation plane located within the cartilage.

6. The apparatus of claim 1 for use with a deboning conveyor mounting each poultry carcass on a support mandrel and sequentially moving the support mandrels along said prescribed processing path:

wherein said positioning means is operatively associated with said deboning conveyor so that said positioning means orients each poultry carcass on said support mandrels so that the skeletal portion of the poultry carcass is moved along said prescribed processing path with the breastbone in said prescribed orientation; and wherein said separation means is operatively associated with the deboning conveyor so that said separation means engages the cartilage connected to the breastbone as the skeletal portion of each poultry carcass supported on the support mandrel is moved along said prescribed processing path with said prescribed orientation to mechanically separate the cartilage from the breastbone as the poultry carcass is moved along said prescribed processing path.

7. The apparatus of claim 6 wherein said positioning means includes mandrel guide means operatively associated with said deboning conveyor for maintaining the support mandrels in alignment with said prescribed processing path as the deboning conveyor moves the support mandrels, and carcass guide means operatively associated with said deboning conveyor for engaging the skeletal portion of each poultry carcass supported on the support mandrels to maintain the skeletal portion of the poultry carcass in said prescribed orientation as the skeletal portion of the poultry carcass is moved along said processing path on the support mandrel; and wherein said separation means includes first means operatively associated with said deboning conveyor for cutting partly through the cartilage adjacent the juncture between the breastbone and the cartilage as the skeletal portion of the poultry carcass is moved along said prescribed processing path on the support mandrel in said prescribed orientation and second means operatively associated with the deboning conveyor for forcing the cartilage away from the breastbone to completely separate the cartilage from the breastbone along a separation plane coaxial with the cut formed by said first means.

8. The apparatus of claim 7 wherein said separation means further includes membrane separation means operatively associated with the deboning conveyor for separating membranes and meat fragments connecting the cartilage to the rest of the skeletal portion of the poultry carcass from the cartilage after the cartilage has been separated from the breastbone.

9. The apparatus of claim 7 wherein said separation means further includes cartilage support means for supporting the cartilage in opposition to said first means for cutting partly through the cartilage.

10. In apparatus for use in deboning poultry carcasses comprising a plurality of base support members interconnected so as to form an endless conveyor, a plurality of upstanding mandrel supports mounted on the support members, a vertically oriented support mandrel adapted to fit inside a poultry carcass to support same mounted on the upper end of each of the mandrel supports so that the support mandrels are moved along a prescribed linear processing path, and guides for stabilizing the base support members in vertical and transverse directions, the improvement comprising:

cartilage harvesting means operatively associated with said support mandrels for separating the cartilage from the breastbone of the poultry carcass after the deboning operation and while the skeletal portion of the poultry carcasses are still supported on the support mandrels and moving along said prescribed linear processing path.

11. In the apparatus of claim 10 wherein said support mandrels define a central axis therethrough and are constructed and arranged so that the poultry carcasses supported thereon can be rotated about said central axis; and wherein said cartilage harvesting means is further constructed and arranged to orient the poultry carcasses about said central axis while the cartilage is separated from the breastbone of the poultry carcass.

12. In the apparatus of claim 10 wherein said improvement further comprises positioning means for engaging the separated shoulder joints of the skeletal portions of the poultry carcasses carried by the support mandrels to orient the poultry carcass so that the common line joining the separated shoulder joints is generally parallel to said prescribed processing path along which the poultry carcass is moved and to vertically locate the poultry carcass relative to the support mandrel as the support mandrels are moved along said prescribed processing path.

13. In the apparatus of claim 12 wherein said cartilage harvesting means further comprises:

cartilage positioning means for supporting the interior side of the cartilage joined to the breastbone as the carcass is moved along said prescribed processing path on the support mandrel; and cartilage cutting means for cutting at least partly through the cartilage adjacent the juncture between the breastbone and the cartilage as the poultry carcass is moved along said prescribed processing path on the support mandrel and while supported by said cartilage positioning means.

14. A method of harvesting the cartilage from the breastbone of the skeletal portion of a poultry carcass after removal of the meat therefrom comprising the step of:

a) mechanically separating the cartilage from the breastbone along a separation plane located within the cartilage adjacent the juncture between the breastbone and the cartilage.

15. The method of claim 14 further comprising the step of:

b) mechanically orienting the skeletal portion of the poultry carcass while the cartilage is being mechanically separated from the breastbone.

16. The method of claim 14 further comprising the step of:

b) mechanically separating membranes and meat fragments connecting the cartilage to the skeletal portion of the poultry carcass from the cartilage.

17. The method of claim 14 wherein step a) further comprises cutting partly through the cartilage adjacent the juncture between the breastbone and the cartilage and then forcing the cartilage to completely separate from the breastbone along a separation plane generally coaxial with the cut formed in the cartilage.

18. The method of claim 14 further comprising the steps of:

b) mechanically moving the skeletal portion of the poultry carcass along a prescribed linear processing path while the cartilage is being separated from the breastbone; and c) mechanically engaging the separated shoulder joints between the wings and body on the poultry carcass to maintain the line joining the separated shoulder joints generally parallel to the prescribed linear processing path while the cartilage is being separated from the breastbone.

19. The method of claim 18 wherein step a) further comprises fixedly positioning a blade member adjacent the processing path so as to cut partly through the cartilage adjacent the juncture between the breastbone and the cartilage and then force the cartilage to completely separate from the breastbone along a separation plane generally coaxial with the cut formed in the cartilage as the skeletal portion of the poultry carcass is conveyed along the processing path.

* * * * *